US012693464B2

(12) United States Patent
Tryon et al.

(10) Patent No.: US 12,693,464 B2
(45) **Date of Patent: \*Jul. 28, 2026**

(54) ELECTRONIC DEVICE COATINGS HAVING MULTI-LAYER INTERFERENCE FILMS

(71) Applicant: Apple Inc., Cupertino, CA (US)

(72) Inventors: Brian S Tryon, Redwood City, CA (US); Naoto Matsuyuki, Kasugai (JP); Shuichi Shimada, Tokyo (JP); Bin Fan, Tokyo (JP); Hyuga Taniguchi, Tsurugashima (JP)

(73) Assignee: Apple Inc., Cupertino, CA (US)

( \* ) Notice: Subject to any disclaimer, the term of this patent is extended or adjusted under 35 U.S.C. 154(b) by 626 days.

This patent is subject to a terminal disclaimer.

(21) Appl. No.: 18/156,905

(22) Filed: Jan. 19, 2023

(65) Prior Publication Data

US 2023/0244018 A1 Aug. 3, 2023

Related U.S. Application Data

(60) Provisional application No. 63/305,533, filed on Feb. 1, 2022.

(51) Int. Cl.
*G02B 5/28* (2006.01)
(52) U.S. Cl.
CPC ................................... *G02B 5/285* (2013.01)
(58) Field of Classification Search
None
See application file for complete search history.

(56) References Cited

U.S. PATENT DOCUMENTS

| | | | |
|---|---|---|---|
| 10,890,700 B2 | 1/2021 | Cool et al. | |
| 11,136,672 B2 | 10/2021 | Tryon et al. | |
| 2020/0408976 A1* | 12/2020 | Kim ....................... | G02B 5/285 |
| 2021/0048565 A1 | 2/2021 | Tryon et al. | |
| 2021/0286112 A1 | 9/2021 | Tryon et al. | |
| 2022/0066397 A1 | 3/2022 | Matlak et al. | |
| 2022/0350062 A1 | 11/2022 | Bao et al. | |
| 2022/0381962 A1* | 12/2022 | Sahara ................... | G02B 5/285 |

FOREIGN PATENT DOCUMENTS

| | | | |
|---|---|---|---|
| CN | 103804963 A | 5/2014 | |
| CN | 108728847 A | 11/2018 | |
| WO | WO-2021117598 A1 * | 6/2021 | ......... C03C 17/3482 |

\* cited by examiner

*Primary Examiner* — Kim S. Horger

(74) *Attorney, Agent, or Firm* — Treyz Law Group, P.C.; Michael H. Lyons

(57) ABSTRACT

An electronic device may be provided with conductive structures such as conductive housing structures. A visible-light-reflecting coating may be formed on the conductive structures. The coating may have adhesion and transition layers and a multi-layer thin-film interference filter on the adhesion and transition layers. The multi-layer thin-film interference filter may have an uppermost SiCrN layer, a lowermost TiN layer, and a set of SiN layers interleaved with a set of SiH layers. The coating may exhibit an orange, yellow, or red color that has a relatively uniform visual response at different viewing angles even when the underlying conductive structures have a three-dimensional shape.

20 Claims, 11 Drawing Sheets

ELECTRONIC DEVICE COATINGS HAVING MULTI-LAYER INTERFERENCE FILMS

This application claims the benefit of U.S. provisional patent application No. 63/305,533, filed Feb. 1, 2022, which is hereby incorporated by reference herein in its entirety.

FIELD

This disclosure relates generally to coatings for electronic device structures and, more particularly, to visible-light-reflecting coatings for conductive electronic device structures.

BACKGROUND

Electronic devices such as cellular telephones, computers, watches, and other devices contain conductive structures such as conductive housing structures. The conductive structures are provided with a coating that reflects particular wavelengths of light so that the conductive components exhibit a desired visible color.

It can be challenging to provide coatings such as these with a desired color brightness. In addition, if care is not taken, the coatings may exhibit unsatisfactory optical performance across different operating environments and conductive structure geometries.

SUMMARY

An electronic device may include conductive structures such as conductive housing structures. A visible-light-reflecting coating may be formed on the conductive structures. The coating may have adhesion and transition layers and a multi-layer thin-film interference filter on the adhesion and transition layers. The multi-layer thin-film interference filter may have an uppermost SiCrN layer, a lowermost TiN layer, and a set of SiN layers interleaved with a set of SiH layers. The coating may exhibit an orange, yellow, or red color that has a relatively uniform visual response at different viewing angles even when the underlying conductive structures have a three-dimensional shape.

An aspect of the disclosure provides an apparatus. The apparatus can include a conductive substrate. The apparatus can include a coating on the conductive substrate and having a color. The coating can include adhesion and transition layers. The coating can include a thin-film interference filter on the adhesion and transition layers, where the thin-film interference filter includes a SiCrN layer that forms an uppermost layer of the thin-film interference filter, a TiN layer that forms a lowermost layer of the thin-film interference filter, a set of SiH layers, and a set of SiN layers interleaved with the set of SiH layers.

Another aspect of the disclosure provides an apparatus. The apparatus can include a conductive substrate. The apparatus can include a coating on the conductive substrate and having a color. The coating can include adhesion and transition layers. The coating can include a TiN layer on the adhesion and transition layers. The coating can include first and second SiH layers. The coating can include first and second SiN layers, where the first SiH layer is interposed between the first and second SiN layers and where the first SiN layer is interposed between the first SiH layer and the TiN layer. The coating can include a SiCrN layer, where the second SiH layer is interposed between the SiCrN layer and the second SiN layer.

Yet another aspect of the disclosure provides an electronic device. The electronic device can include a conductive structure. The electronic device can include a coating on the conductive structure and having a color. The coating can include adhesion and transition layers. The coating can include a first layer on the adhesion and transition layer that includes titanium and nitrogen. The coating can include a second layer that includes silicon and nitrogen. The coating can include a third layer that includes silicon and hydrogen. The coating can include a fourth layer that includes silicon and nitrogen. The coating can include a fifth layer that includes silicon and hydrogen. The coating can include a sixth layer that includes silicon, chromium, and nitrogen.

DETAILED DESCRIPTION

Electronic devices and other items may be provided with conductive structures. Coatings may be formed on the conductive structures to reflect particular wavelengths of visible light so that the conductive structures exhibit a desired color. A visible-light-reflecting coating may be deposited on a conductive substrate. The coating may include transition and adhesion layers on the substrate and a multi-layer thin-film interference filter on the transition and adhesion layers. The thin-film interference filter may be a six-layer thin-film interference filter having a lowermost TiN layer, a first SiN layer, a first SiH layer, a second SiN layer, a second SiH layer, and an uppermost SiCrN layer. The adhesion and transition layers may include Cr, CrN, or CrSiN. The coating may exhibit a robust orange, red, or yellow color that exhibits a relatively uniform visual response at different viewing angles and when the underlying conductive structures have a three-dimensional shape.

Figure 1:
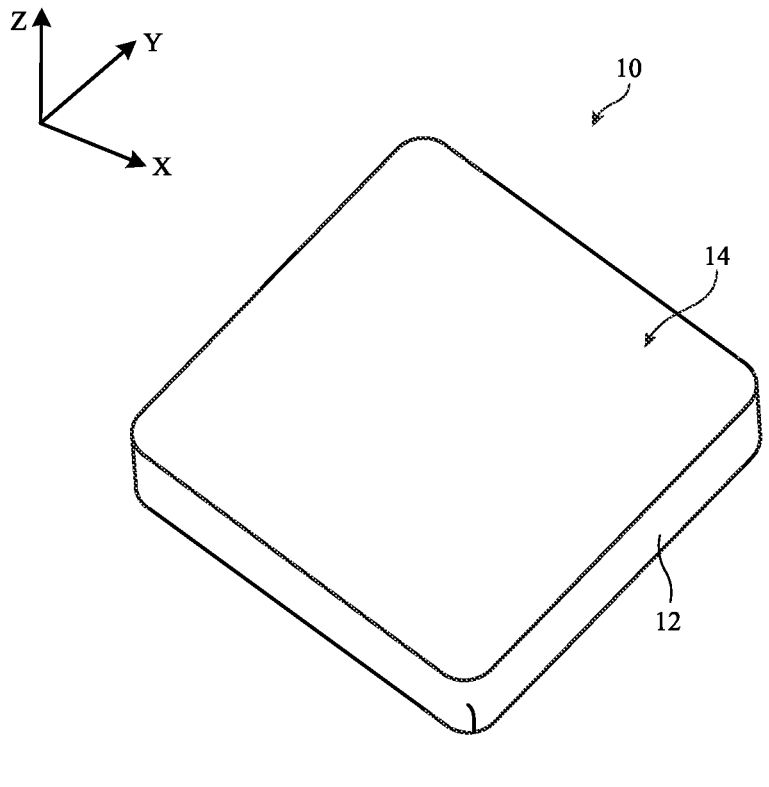
FIG. 1 is a perspective view of an illustrative electronic device of the type that may be provided with conductive structures and visible-light-reflecting coatings in accordance with some embodiments.

An illustrative electronic device of the type that may be provided with conductive structures visible-light-reflecting coatings is shown in FIG. 1. Electronic device 10 of FIG. 1 may be a computing device such as a laptop computer, a computer monitor containing an embedded computer, a tablet computer, a cellular telephone, a media player, or other handheld or portable electronic device, a smaller device such as a wristwatch device (e.g., a watch with a wrist strap), a pendant device, a headphone or earpiece device, a device embedded in eyeglasses or other equipment worn on a user's head (e.g., a head mounted device), or other wearable or miniature device, a television, a computer display that does not contain an embedded computer, a gaming device, a navigation device, an embedded system such as a system in which electronic equipment with a display is mounted in a kiosk or automobile, a wireless base station, a home entertainment system, a wireless speaker device, a wireless access point, equipment that implements the functionality of two or more of these devices, or other electronic equipment. In the illustrative configuration of FIG. 1, device 10 is a portable device having a substantially rectangular lateral outline such as a cellular telephone or tablet computer. Other configurations may be used for device 10 if desired. The example of FIG. 1 is merely illustrative.

In the example of FIG. 1, device 10 includes a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have metal sidewalls or sidewalls formed from other materials. Examples of metal materials that may be used for forming housing 12 include stainless steel, aluminum, silver, gold, titanium, metal alloys, or any other desired conductive material.

Display 14 may be formed at (e.g., mounted on) the front side (face) of device 10. Housing 12 may have a rear housing wall on the rear side (face) of device 10 that opposes the front face of device 10. Conductive housing sidewalls in housing 12 may surround the periphery of device 10. The rear housing wall of housing 12 may be formed from conductive materials and/or dielectric materials.

The rear housing wall of housing 12 and/or display 14 may extend across some or all of the length (e.g., parallel to the X-axis of FIG. 1) and width (e.g., parallel to the Y-axis) of device 10. Conductive sidewalls of housing 12 may extend across some or all of the height of device 10 (e.g., parallel to Z-axis).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode (OLED) display pixels, an array of electrowetting display pixels, or display pixels based on other display technologies.

Display 14 may be protected using a display cover layer. The display cover layer may be formed from a transparent material such as glass, plastic, sapphire or other crystalline dielectric materials, ceramic, or other clear materials. The display cover layer may extend across substantially all of the length and width of device 10, for example.

Device 10 may include one or more buttons. The buttons may be formed from a conductive button member that is located within (e.g., protruding through) openings in housing 12 or openings in display 14 (as examples). Buttons may be rotary buttons, sliding buttons, buttons that are actuated by pressing on a movable button member, etc.

Figure 2:
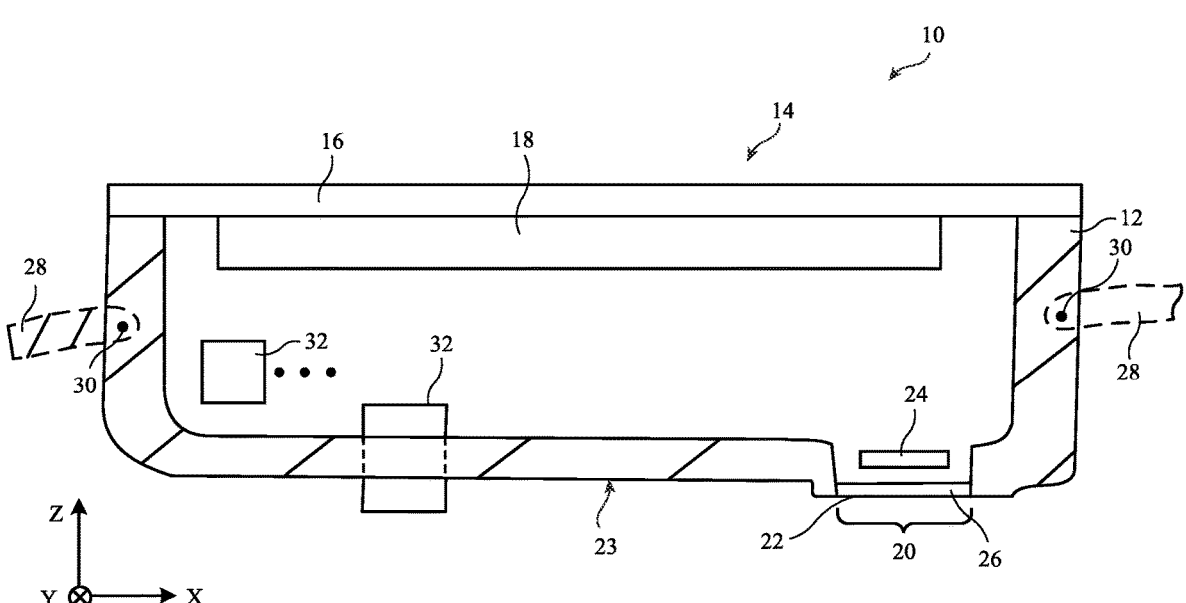
FIG. 2 is cross-sectional side view of an illustrative electronic device having conductive structures that may be provided with visible-light-reflecting coatings in accordance with some embodiments.

A cross-sectional side view of device 10 in an illustrative configuration in which display 14 has a display cover layer is shown in FIG. 2. As shown in FIG. 2, display 14 may have one or more display layers that form pixel array 18. During operation, pixel array 18 forms images for a user in an active area of display 14. Display 14 may also have inactive areas (e.g., areas along the border of pixel array 18) that are free of pixels and that do not produce images. Display cover layer 16 of FIG. 2 overlaps pixel array 18 in the active area and overlaps electrical components in device 10.

Display cover layer 16 may be formed from a transparent material such as glass, plastic, ceramic, or crystalline materials such as sapphire. Illustrative configurations in which a display cover layer and other transparent members in device 10 (e.g., windows for cameras and other light-based devices that are formed in openings in housing 12) are formed from a hard transparent crystalline material such as sapphire (sometimes referred to as corundum or crystalline aluminum oxide) may sometimes be described herein as an example. Sapphire makes a satisfactory material for display cover layers and windows due to its hardness (9. Mohs). In general, however, these transparent members may be formed from any suitable material.

Display cover layer 16 for display 14 may be planar or curved and may have a rectangular outline, a circular outline, or outlines of other shapes. If desired, openings may be formed in the display cover layer. For example, an opening may be formed in the display cover layer to accommodate a button, a speaker port, or other component. Openings may be formed in housing 12 to form communications or data ports (e.g., an audio jack port, a digital data port, a port for a subscriber identity module (SIM) card, etc.), to form openings for buttons, or to form audio ports (e.g., openings for speakers and/or microphones).

Device 10 may, if desired, be coupled to a strap such as strap 28 (e.g., in scenarios where device 10 is a wristwatch device). Strap 28 may be used to hold device 10 against a user's wrist (as an example). Strap 28 may sometimes be referred to herein as wrist strap 28. In the example of FIG. 2, wrist strap 28 is connected to attachment structures 30 in housing 12 at opposing sides of device 10. Attachment structures 30 may include lugs, pins, springs, clips, brackets, and/or other attachment mechanisms that configure housing 12 to receive wrist strap 28. Configurations that do not include straps may also be used for device 10.

Figure 3:
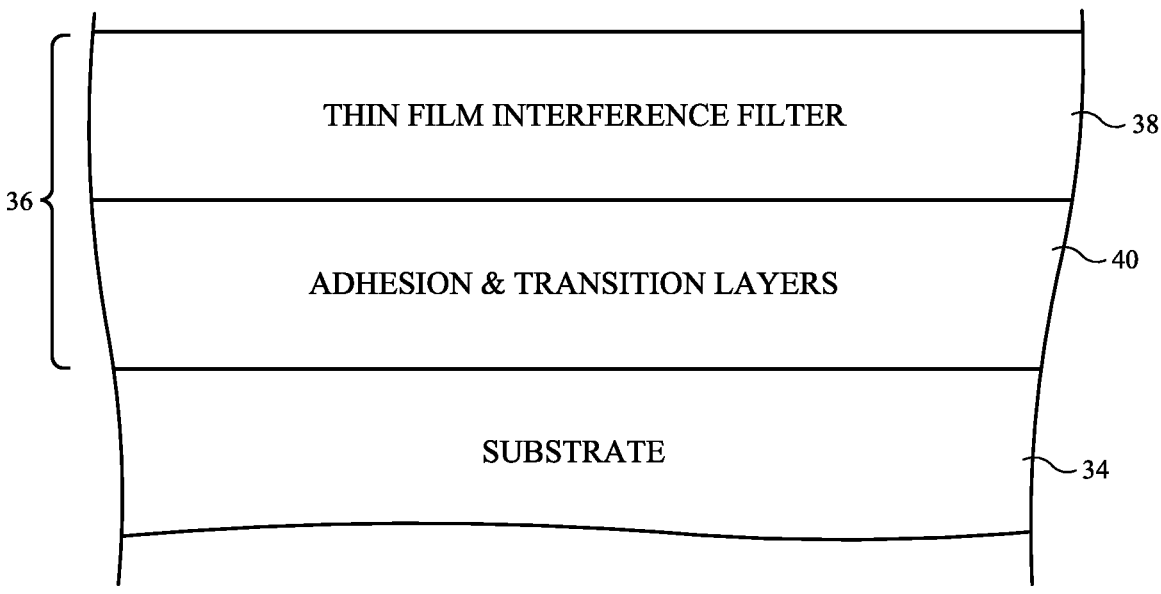
FIG. 3 is a cross-sectional side view of an illustrative visible-light-reflecting coating having a multi-layer interference film in accordance with some embodiments.

If desired, light-based components such as light-based components 24 may be mounted in alignment with an opening 20 in housing 12. Opening 20 may be circular, may be rectangular, may have an oval shape, may have a triangular shape, may have other shapes with straight and/or curved edges, or may have other suitable shapes (outlines when viewed from above). Window member 26 may be mounted in window opening 20 of housing 12 so that window member 26 overlaps component 18. A gasket, bezel, adhesive, screws, or other fastening mechanisms may be used in attaching window member 26 to housing 12. Surface 22 of window member 26 may lie flush with exterior surface 23 of housing 12, may be recessed below exterior surface 23, or may, as shown in FIG. 3, be proud of exterior surface 23 (e.g., surface 22 may lie in a plane that protrudes away from surface 23 in the −Z direction). In other words, window member 26 may be mounted to a protruding portion of housing 12. Surface 23 may, for example, form the rear face of housing 12.

Conductive structures in device 10 may be provided with a visible-light-reflecting coating that reflects certain wavelengths of light so that the conductive structures exhibit a desired aesthetic appearance (e.g., a desired color, reflectivity, etc.). The conductive structures in device 10 may include, for example, conductive portions of housing 12 (e.g., conductive sidewalls for device 10, a conductive rear wall for device 10, a protruding portion of housing 12 used to mount window member 26, etc.), attachment structures 30, conductive portions of wrist strap 28, a conductive mesh, conductive components 32, and/or any other desired conductive structures on device 10. Conductive components 32 may include internal components (e.g., internal housing members, a conductive frame, a conductive chassis, a conductive support plate, conductive brackets, conductive clips, conductive springs, input-output components or devices, etc.), components that lie both at the interior and exterior of device 10 (e.g., a conductive SIM card tray or SIM card port, a data port, a microphone port, a speaker port, a conductive button member for a ringer button, power button, volume button, or other buttons, etc.), components that are mounted at the exterior of device 10 (e.g., conductive portions of strap 28 such as a clasp for strap 28), and/or any other desired conductive structures on device 10.

FIG. 3 is a cross-sectional diagram of a visible-light-reflecting coating having a multi-layer thin-film interference filter that may be provided on conductive structures in device 10 (e.g., portions of housing 12 of FIGS. 1 and 2, conductive components 32 of FIG. 2, etc.). As shown in FIG. 3, visible-light-reflecting coating 36 may be formed on a conductive substrate such as substrate 34. Visible-light-reflecting coating 36 may sometimes be referred to herein simply as coating 36. Substrate 34 may be a conductive structure in device 10 such as a conductive portion of housing 12 (FIGS. 1 and 2) or a conductive component 32 (FIG. 2). Substrate 34 may be thicker than coating 36. The thickness of substrate 34 may be 0.1 mm to 5 mm, more than 0.3 mm, more than 0.5 mm, between 5 mm and 20 mm, less than 5 mm, less than 2 mm, less than 1.5 mm, or less than 1 mm (as examples). Substrate 34 may include stainless steel, aluminum, titanium, or other metals or alloys. In other suitable arrangements, substrate 34 may be an insulating substrate such as a ceramic substrate, a glass substrate, or substrates formed from other materials.

Coating 36 may include adhesion and transition layers 40 on substrate 34 and a multi-layer thin-film interference filter such as thin-film interference filter 38 on adhesion and transition layers 40. An optional oleophobic coating may be layered over thin-film interference filter 38 if desired. In these examples, the thicknesses of the layers of the coating as described herein may be adjusted so the coating produces the same target color response given the presence of the oleophobic coating and any adhesion layers such as an SiO2 layer used to bond to the oleophobic coating). Thin-film interference filter 38 may, for example, have a first lateral surface that directly contacts adhesion and transition layers 40 and may have a second lateral surface opposite the first lateral surface. Thin-film interference filter 38 may include multiple layers stacked on adhesion and transition layers 40. In one suitable arrangement that is described herein as an example, thin-film interference filter 38 may include six layers. This is merely illustrative and, if desired, thin-film interference filter 38 may include other numbers of layers (e.g., three layers, five layers, four layers, two layers, more than six layers, etc.).

The layers of coating 36 may be deposited on substrate 34 using any suitable deposition techniques. Examples of techniques that may be used for depositing the layers in coating 36 include physical vapor deposition (e.g., evaporation and/or sputtering), cathodic arc deposition, chemical vapor deposition, ion plating, laser ablation, etc. For example, coating 36 may be deposited on substrate 34 in a deposition system having deposition equipment (e.g., a cathode). Substrate 34 may be moved (e.g., rotated) within the deposition system while the deposition equipment (e.g., the cathode) deposits the layers of coating 36. If desired, substrate 34 may be moved/rotated dynamically with respect to speed and/or orientation relative to the deposition equipment (e.g., the cathode) during deposition. This may help provide coating 36 with as uniform a thickness as possible across its area, even in scenarios where substrate 34 has a three-dimensional shape.

Thin-film interference filter 38 may be formed from a stack of layers of material such as inorganic dielectric layers with different index of refraction values. The thin-film interference filter layers may have higher index of refraction values (sometimes referred to as "high" index values) and lower index of refraction values (sometimes referred to as "low" index values). The high index layers may be interleaved with the low index layers if desired. Incident light may be transmitted through each of the layers in thin-film interference filter 38 while also reflecting off the interfaces between each of the layers, as well as at the interface between the thin-film interference filter and adhesion and transition layers 40 and at the interface between the thin-film interference filter and air. By controlling the thickness and index of refraction (e.g., composition) of each layer in thin-film interference filter 38, the light reflected at each interface may destructively and/or constructively interfere at a selected set of wavelengths such that reflected light that passes out of the thin-film interference filter 38 is perceived by an observer with a desired color and brightness across a corresponding range of viewing angles (angles of incidence, e.g., from 0 to 60 degrees relative to a normal axis of the conductive structure), while also exhibiting a response that is relatively invariant across the lateral area of the coating even when deposited onto an underlying substrate 34 having a three-dimensional (e.g., curved) shape.

Figure 4:
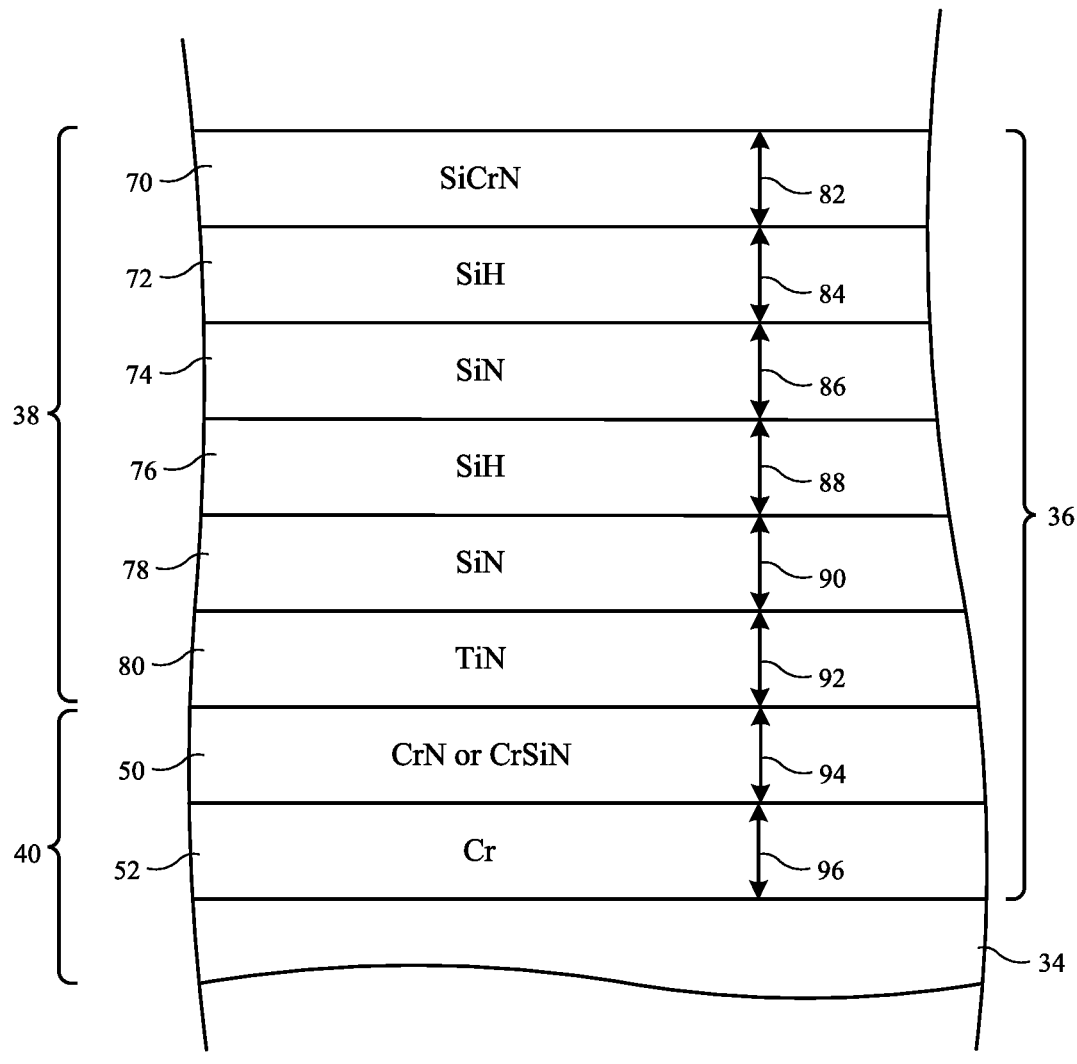
FIG. 4 is a cross-sectional side view of an illustrative visible-light-reflecting coating having a six-layer interference film with an uppermost SiCrN layer, alternating SiH and SiN layers, and a TiN layer on underlying adhesion and transition layers in accordance with some embodiments.

FIG. 4 is a cross-sectional side view showing one illustrative composition for coating 36. As shown in FIG. 4, coating 36 may be layered on substrate 34. Adhesion and transition layers 40 may include a seed (adhesion) layer such as seed layer 52 on substrate 34 and one or more transition layers such as transition layer 50 on seed layer 52. Seed layer 52 may couple substrate 34 to transition layer 50. In the example of FIG. 4, seed layer 52 is formed from chromium (Cr) and transition layer 50 is formed from chromium nitride (CrN) or chromium silicon nitride (CrSiN). This is merely illustrative. If desired, seed layer 52 and/or transition layer 50 may include chromium silicon (CrSi), titanium (Ti), chromium silicon nitride (CrSiN), chromium silicon carbonitride (CrSiCN), chromium silicon carbide (CrSiC), chromium carbonitride (CrCN), other metals, metal alloys, and/or other materials. Coating 36 may include multiple stacked transition layers 50 if desired.

Seed layer 52 may have thickness 96. Thickness 96 may be, for example, 10-20 microns, 8-25 microns, 5-30 microns, 12-18 microns, 5-20 microns, 1-40 microns, 12 microns, 15 microns, 18 microns, or other thicknesses. Transition layer 50 may have thickness 94. Thickness 94 may be 0.9-1.3 microns, 0.8-1.2 microns, 0.8-1.4 microns, 0.5-1.5 microns, 1 micron, 1.1 microns, 1.2 microns, 0.8 microns, 0.5-1.2 micron, 0.9 microns, or other thicknesses. In examples where transition layer 50 includes CrSiN (e.g., when transition layer 50 is a CrSiN layer), the composition of transition layer 50 may be selected such that the atomic percentage (%) of chromium (Cr) atoms in transition layer 50 is between 60-70%, 50-75%, 58-68%, 60-66%, 55-70%, greater than 65%, greater than 60%, greater than 55%, greater than 50%, less than 70%, less than 75%, less than 80%, or other values. The composition of transition layer 50 may be selected such that the atomic percentage of silicon (Si) atoms in transition layer 50 is between 20-30%, 15-35%, 10-40%, 22-28%, 21-29%, 20-28%, 18-38%, 24-26%, greater than 22%, greater than 20%, greater than 15%, less than 28%, less than 30%, less than 35%, or other values. The composition of transition layer 50 may be selected such that the atomic percentage of nitrogen (N) atoms in transition layer 50 is between 10-20%, 12-18%, 5-25%, 10-15%, 2-30%, greater than 15%, greater than 12%, greater than 10%, greater than 5%, less than 20%, less than 25%, or other values. Transition layer 50 and seed layer 52 may collectively exhibit a color having an L* value of 70-80, an a* value around 0, and a b* value between 0 and 10, for example.

In the example of FIG. 4, thin-film interference filter 38 has six layers (e.g., layers 80, 78, 76, 74, 72, and 70). Thin-film interference filter 38 may also sometimes be referred to as a five-layer thin-film interference layer where the lowermost layer of the thin-film interference filter forms an opaque coloring layer that contributes to the color response of the thin-film interference filter.

As shown in FIG. 4, thin-film interference filter 38 may include a lowermost (bottom) layer 80 (or an opaque coloring layer for the thin-film interference layer) that is layered onto transition layer 50 (e.g., the uppermost of the transition layers in examples where coating 36 includes multiple transition layers). Layer 80 may have thickness 92. Thin-film interference filter 38 may include a second-lowermost layer 78 that is layered onto layer 80. Layer 80 may have thickness 90. Thin-film interference filter 38 may include a third-lowermost layer 76 that is layered onto layer 78. Layer 76 may have thickness 88. Thin-film interference filter 38 may include a third-uppermost layer 74 that is layered onto layer 76. Layer 74 may have thickness 86.

Thin-film interference filter 38 may include a second-uppermost layer 72 that is layered onto layer 74. Layer 72 may have thickness 84. Thin-film interference filter 38 may also include an uppermost layer 70 that is layered onto layer 72. Layer 70 may have thickness 82.

Layer 70 may include silicon chromium nitride (SiCrN) and may therefore sometimes be referred to herein as SiCrN layer 70. Layer 72 may include silicon hydride (SiH) and may therefore sometimes be referred to herein as SiH layer 72. Layer 74 may include silicon nitride (SiN) and may therefore sometimes be referred to herein as SiN layer 74. Layer 76 may include SiH and may therefore sometimes be referred to herein as SiH layer 76. Layer 78 may include SiN and may therefore sometimes be referred to herein as SiN layer 78. Layer 80 may include titanium nitride (TiN) may therefore sometimes be referred to herein as TiN layer 80. Put differently, thin-film interference filter 38 may include an uppermost SiCrN layer 70, a lowermost TiN layer 80, and a set of alternating SiH layers (e.g., a set of one or more SiH layers such as a set of two SiH layers 72 and 76) and a set of alternating SiN layers (e.g., a set of one or more SiN layers such as a set of two SiN layers 74 and 78) interleaved with the set of alternating SiH layers. The example of FIG. 4 is merely illustrative. The layers of thin-film interference filter 38 may be disposed in other orders, the set of alternating SiH layers may include any desired number of SiH layers, the set of alternating SiN layers may include any desired number of SiN layers, and/or any of the layers of thin-film interference filter 38 may have other compositions.

In a first implementation, the composition and thicknesses of the layers of thin-film interference filter 38 may be selected so that coating 36 exhibits a substantially orange color across a predetermined range of angles of incidence. In this example, the thickness 82 of SiCrN layer 70 may be selected to be 20-50 nm, 30-40 nm, 35-40 nm, 30-45 nm, 25-45 nm, 36-38 nm, 25-40 nm, 30-39 nm, 37 nm, 38 nm, 39 nm, 34 nm, 30-45 nm, less than 45 nm, less than 40 nm, or other thicknesses. The thickness 84 of SiH layer 72 may be selected to be 30-80 nm, 40-60 nm, 45-50 nm, 45-55 nm, 35-60 nm, 42-54 nm, 46-56 nm, 49 nm, 48 nm, 50 nm, 52 nm, greater than 45 nm, greater than 40 nm, less than 55 nm, less than 50 nm, or other thicknesses. The thickness 86 of SiN layer 74 may be selected to be 10-120 nm, 10-20 nm, 15-25 nm, 5-30 nm, 14-19 nm, 10-25 nm, 16 nm, 15 nm, 18 nm, 22 nm, or other thicknesses. The thickness 88 of SiH layer 76 may be selected to be 30-70 nm, 50-60 nm, 55-60 nm, 50-65 nm, 53-61 nm, 57 nm, 58 nm, 52 nm, or other thicknesses. The thickness 90 of SiN layer 78 may be selected to be 10-40 nm, 10-30 nm, 15-28 nm, 18-23 nm, 5-50 nm, 20 nm, 25 nm, 15 nm, 19 nm, greater than 15 nm, greater than 10 nm, less than 25 nm, less than 30 nm, or other thicknesses. Finally, the thickness 92 of TiN layer 80 may be selected to be 30-80 nm, 30-50 nm, 30-40 nm, 30-45 nm, 25-45 nm, 24-50 nm, 35-40 nm, 35-39 nm, 38 nm, 35 nm, 39 nm, 41 nm, greater than 35 nm, greater than 30 nm, less than 40 nm, less than 50 nm, or other thicknesses. In another suitable arrangement, thickness 92 of TiN layer 80 may be relatively large such as greater than 50 nm, greater than 100 nm, or greater than 200 nm. Increasing the thickness of TiN layer 80 in this way may configure TiN layer 80 to be at least partially opaque, for example. In the first implementation, transition layer 50 may include CrSiN and may have a thickness of 500-1500 nm, 100-2000 nm, 800-1200 nm, 500-1100 nm, 950-1190 nm, 1000 nm, 800-1300 nm, 950 nm, greater than 800 nm, greater than 500 nm, greater than 100 nm, less than 1100 nm, less than 1500 nm, less than 2000 nm, or other thicknesses.

Figure 5:
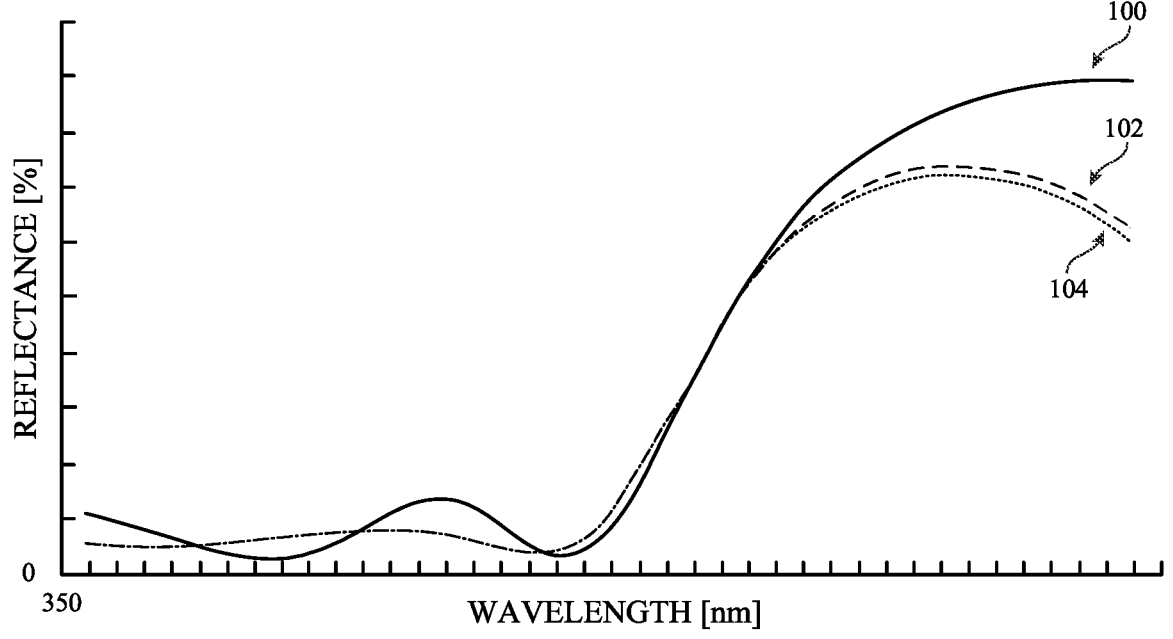
FIG. 5 is a plot a reflectance as a function of wavelength for three illustrative coatings of the type shown in FIG. 4 that exhibit an orange hue in accordance with some embodiments.

FIG. 5 is a plot of the color response for different configurations of coating 36 of FIG. 5. Curve 104 of FIG. 5 plots the color response of coating 36 (e.g., in reflectance % as a function of wavelength) in the first implementation. As shown by curve 104, configuring coating 36 according to the first implementation way may provide the coating with a broad peak at relatively long wavelengths in the visible spectrum, which configures the coating to exhibit a relatively bright orange color when viewed by an observer.

Figure 6:
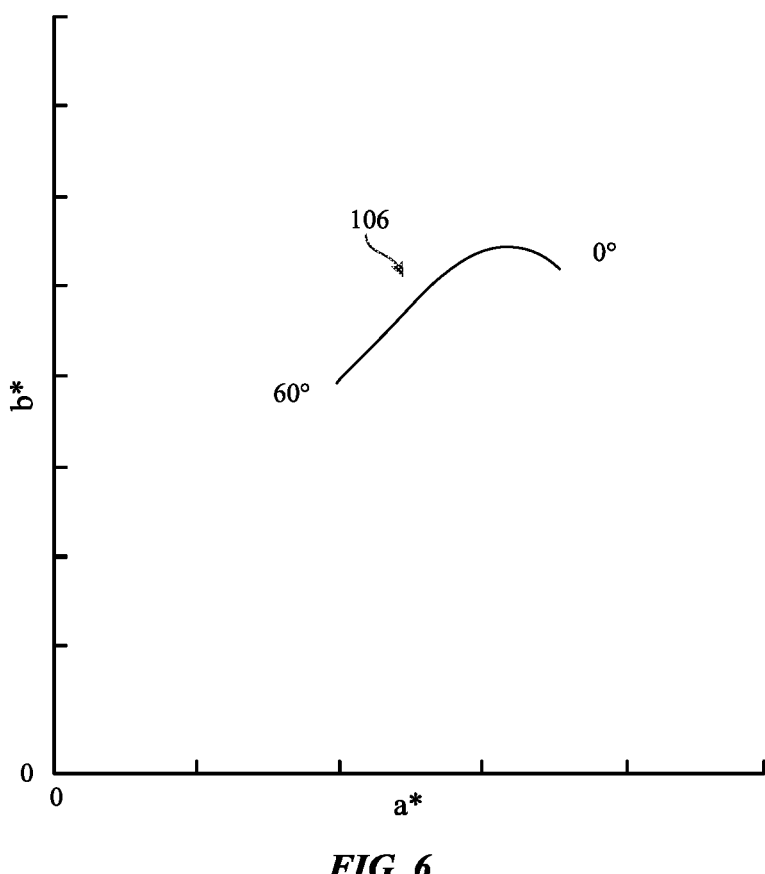
FIG. 6 is a plot of a*b* color space showing how an illustrative coating of the type shown in FIG. 4 may exhibit an orange hue across different angles of incidence in accordance with some embodiments.

In addition, configuring coating 36 according to the first implementation may provide the coating with a relatively stable color response across different viewing angles. Curve 106 of FIG. 6 illustrates how the color of coating 36 (in an a*b* color space) varies at different viewing angles (angles of incidence) from zero degrees to 60 degrees relative to an axis normal to the lateral surface of the coating. As shown by curve 106, shifting view angle causes relatively little variation in the color of coating 36, allowing the coating to maintain a stable orange appearance regardless of how the viewer is viewing the coating.

In a second implementation, coating 36 is provided with the same layer compositions and thicknesses as the first implementation, but transition layer 50 of FIG. 4 is a CrN layer instead of a CrSiN layer. Returning to FIG. 5, curve 102 of FIG. 5 plots the color response of coating 36 in the second implementation. As shown by curve 102, configuring coating 36 according to the second implementation way may provide the coating with a broad peak at relatively long wavelengths in the visible spectrum, which configures the coating to exhibit a relatively bright orange color when viewed by an observer.

As an example, at a viewing angle of zero degrees, coating 36 in the first and second implementations may exhibit an L* value between 50-65, 55-60, 55-65, 57-60, less than 60, less than 65, greater than 55, greater than 50, or other L* values in a L*a*b* color space. At the viewing angle of zero degrees, coating 36 in the first and second implementations may exhibit an a* value between 30-40, 30-35, 30-37, 28-38, less than 35, less than 40, greater than 30, greater than 25, greater than 20, or other a* values in the L*a*b* color space. At the viewing angle of zero degrees, coating 36 in the first and second implementations may exhibit a b* value between 50-60, 45-55, 50-55, 51-54, less than 55, less than 60, greater than 50, greater than 45, greater than 40 or other b* values in the L*a*b* color space.

In a third implementation, transition layer 50 of FIG. 4 includes CrSiN and the composition and thicknesses of the layers of thin-film interference filter 38 may be selected so that coating 36 exhibits a substantially orange color across a predetermined range of angles of incidence. In this example, the thickness 82 of SiCrN layer 70 may be selected to be greater than the thickness of SiCrN layer 70 in the first and second implementations, 40-50 nm, 38-45 nm, 35-48 nm, 30-40 nm, 39-44 nm, greater than 40 nm, greater than 35 nm, less than 45 nm, less than 40 nm, 45 nm, 42 nm, 41 nm, 35 nm, or other thicknesses. The thickness 84 of SiH layer 72 may be selected to be less than the thickness of SiH layer 72 in the first and second implementations, 30-40 nm, 25-45 nm, 30-42 nm, 31-38 nm, greater than 30 nm, greater than 25 nm, less than 40 nm, less than 45 nm, 38 nm, 31 nm, 35 nm, 29 nm, or other thicknesses. The thickness 86 of SiN layer 74 may be selected to be greater than the thickness of SiN layer 74 in the first and second implementations, 100-120 nm, 90-125 nm, 80-110 nm, 100-110 nm, 95-118 nm, greater than 100 nm, greater than 90 nm, greater than 80 nm, less than 110 nm, less than 120 nm, less than 130 nm, 110 nm, 106 nm, 101 nm, 98 nm, 105 nm, or other thicknesses. The thickness 88 of SiH layer 76 may be selected to be less than the thickness of SiH layer 76 in the first and second implementations, 30-40 nm, 25-45 nm, 25-40 nm, 30-35 nm, 29-36 nm, greater than 30 nm, greater than 25 nm, less than 35 nm, less than 40 nm, 30 nm, 33 nm, 36 nm, 29 nm, or other thicknesses. The thickness 90 of SiN layer 78 may be selected to be greater than the thickness of SiN layer 78 in the first and second implementations, 35-45 nm, 30-40 nm, 30-50 nm, 35-44 nm, greater than 30 nm, greater than 35 nm, less than 40 nm, less than 50 nm, 39 nm, 38 nm, 32 nm, 44 nm, or other thicknesses. Finally, the thickness 80 of TiN layer 80 may be selected to be greater than the thickness of layer 80 in the first and second implementations, 60-70 nm, 55-70 nm, 55-75 nm, 60-65 nm, 62-67 nm, greater than 60 nm, greater than 55 nm, greater than 50 nm, less than 70 nm, less than 80 nm, 68 nm, 66 nm, 64 nm, 60 nm, or other thicknesses.

Returning to FIG. 5, curve 100 of FIG. 5 plots the color response of coating 36 in the third implementation. As shown by curve 100, configuring coating 36 according to the third implementation way may provide the coating with a broad peak at relatively long wavelengths in the visible spectrum, which configures the coating to exhibit a relatively bright orange color when viewed by an observer. The third implementation may provide the coating with a slightly more red appearance than the first and second implementations, for example.

In a fourth implementation, transition layer 50 of FIG. 4 includes CrN and the composition and thicknesses of the layers of thin-film interference filter 38 may be selected so that coating 36 exhibits a substantially red color across a predetermined range of angles of incidence. In this example, the thickness 82 of SiCrN layer 70 may be selected to be 30-50 nm, 35-45 nm, 36-54 nm, 30-41 nm, greater than 30 nm, greater than 25 nm, less than 45 nm, less than 50 nm, 43 nm, 40 nm, 35 nm, or other thicknesses. The thickness 84 of SiH layer 72 may be selected to be 50-55 nm, 45-60 nm, 40-60 nm, 51-55 nm, 42-48 nm, 55 nm, 53 nm, 49 nm, greater than 50 nm, greater than 40 nm, less than 60 nm, or other thicknesses. The thickness 86 of SiN layer 74 may be selected to be 10-20 nm, 10-25 nm, 15-25 nm, 10-30 nm, 5-30 nm, greater than 15 nm, greater than 10 nm, less than 20 nm, less than 25 nm, 21 nm, 14 nm, 17 nm, 19 nm, or other thicknesses. The thickness 88 of SiH layer 76 may be selected to be 60-65 nm, 60-70 nm, 55-70 nm, 58-66 nm, 60 nm, 62 nm, 66 nm, or other thicknesses. The thickness 90 of SiN layer 78 may be selected to be 20-30 nm, 15-30 nm, 20-25 nm, 17-23 nm, 22 nm, 25 nm, 16 nm, 18 nm, or other thicknesses. Finally, the thickness 80 of TiN layer 80 may be selected to be 35-45 nm, 30-50 nm, 40-45 nm, 33-42 nm, 41 nm, 45 nm, 37 nm, or other thicknesses.

Figure 7:
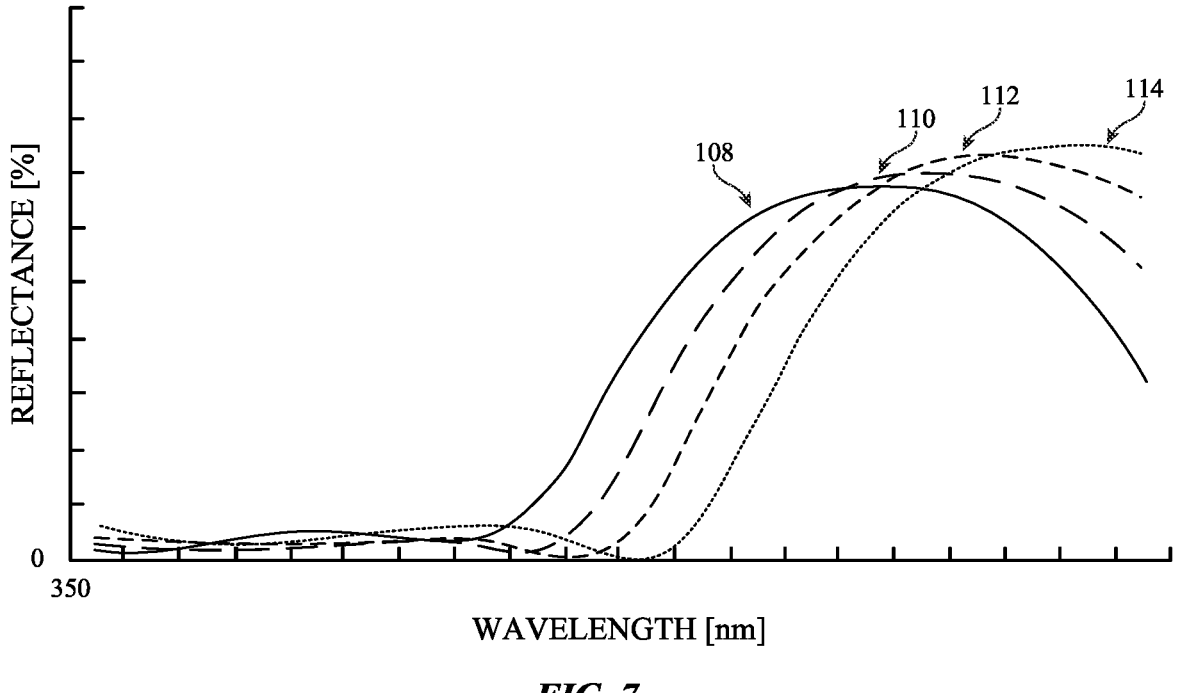
FIG. 7 is a plot of reflectance as a function of wavelength for four additional illustrative coatings of the type shown in FIG. 4 that exhibit a red or orange hue in accordance with some embodiments.

Curve 114 of FIG. 7 plots the color response of coating 36 (reflectance % as a function of wavelength) in the fourth implementation. As shown by curve 114, configuring coating 36 according to the fourth implementation way may provide the coating with a broad peak at relatively long wavelengths in the visible spectrum, which configures the coating to exhibit a relatively bright red color when viewed by an observer.

Figure 8:
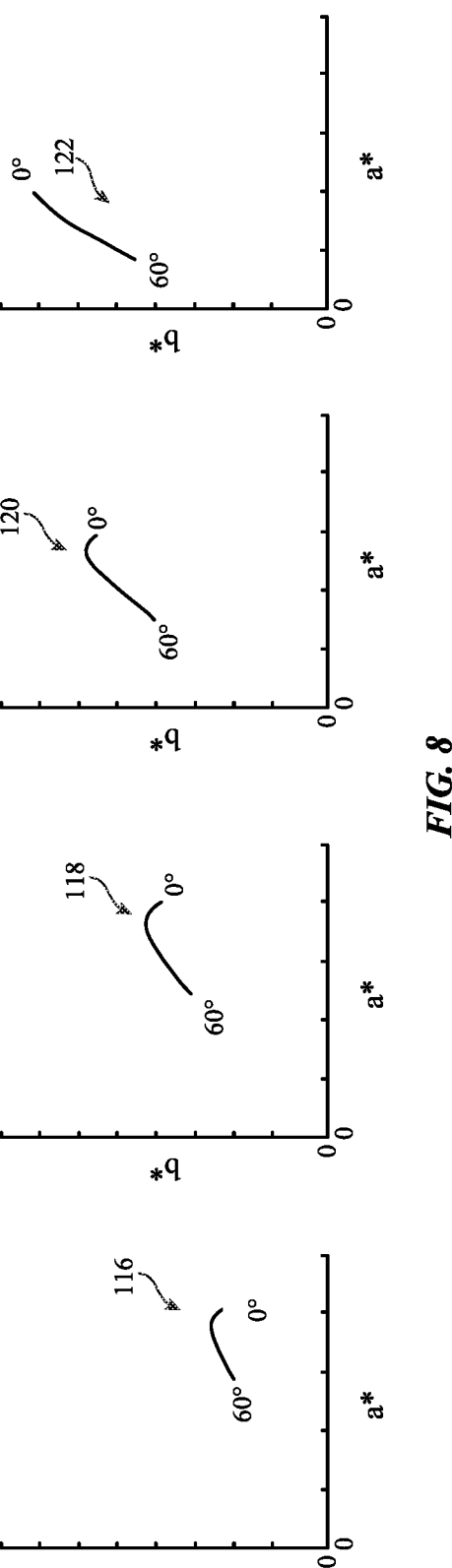
FIG. 8 includes plots of a*b* color space showing how the coatings illustrated in FIG. 7 may exhibit a red or orange hue across different angles of incidence in accordance with some embodiments.

In addition, configuring coating 36 according to the fourth implementation may provide the coating with a relatively stable color response across different viewing angles. Curve 116 of FIG. 8 illustrates how the color of coating 36 (in an a*b* color space) varies at different viewing angles (angles of incidence) from zero degrees to 60 degrees relative to an axis normal to the lateral surface of the coating. As shown by curve 116, shifting view angle causes relatively little variation in the color of coating 36, allowing the coating to maintain a stable red appearance regardless of how the viewer is viewing the coating.

As an example, at a viewing angle of zero degrees, coating 36 in the fourth implementation may exhibit an L* value between 30-50, 35-45, 25-42, 38-42, less than 45, less than 50, greater than 35, greater than 30, or other L* values in a L*a*b* color space. At the viewing angle of zero degrees, coating 36 in the fourth implementation may exhibit an a* value between 40-42, 35-45, 30-50, less than 42, less than 45, greater than 40, greater than 35, or other a* values in the L*a*b* color space. At the viewing angle of zero degrees, coating 36 in the fourth implementation may exhibit a b* value between 23-25, 20-25, 20-30, less than 25, less than 30, greater than 20, greater than 15, or other b* values in the L*a*b* color space.

In a fifth implementation, transition layer 50 of FIG. 4 includes CrN and the layers of thin-film interference filter 38 and the composition and thicknesses of the layers of thin-film interference filter 38 may be selected so that coating 36 exhibits a substantially red-orange color across a predetermined range of angles of incidence. In this example, the thickness 82 of SiCrN layer 70 may be selected to be 30-50 nm, 35-45 nm, 36-54 nm, 30-41 nm, greater than 30 nm, greater than 25 nm, less than 45 nm, less than 50 nm, 38 nm, 41 nm, 35 nm, or other thicknesses. The thickness 84 of SiH layer 72 may be selected to be 45-55 nm, 45-60 nm, 40-60 nm, 41-55 nm, 42-58 nm, 55 nm, 50 nm, 44 nm, or other thicknesses. The thickness 86 of SiN layer 74 may be selected to be 10-20 nm, 10-25 nm, 15-25 nm, 10-30 nm, 5-30 nm, greater than 15 nm, greater than 10 nm, less than 20 nm, less than 25 nm, 21 nm, 12 nm, 17 nm, 16 nm, or other thicknesses. The thickness 88 of SiH layer 76 may be selected to be 55-65 nm, 50-70 nm, 55-70 nm, 58-66 nm, 60 nm, 59 nm, 50 nm, or other thicknesses. The thickness 90 of SiN layer 78 may be selected to be 20-30 nm, 15-30 nm, 20-25 nm, 17-23 nm, 21 nm, 26 nm, 15 nm, 19 nm, or other thicknesses. Finally, the thickness 80 of TiN layer 80 may be selected to be 35-45 nm, 30-50 nm, 40-45 nm, 33-42 nm, 39 nm, 45 nm, 37 nm, or other thicknesses.

Curve 112 of FIG. 7 plots the color response of coating 36 in the fifth implementation. As shown by curve 112, configuring coating 36 according to the fifth implementation way may provide the coating with a broad peak at relatively long wavelengths in the visible spectrum, which configures the coating to exhibit a relatively bright red-orange color when viewed by an observer.

In addition, configuring coating 36 according to the fifth implementation may provide the coating with a relatively stable color response for different viewing angles. Curve 118 of FIG. 8 illustrates how the color of coating 36 (in an a*b* color space) varies at different viewing angles (angles of incidence) from zero degrees to 60 degrees relative to an axis normal to the lateral surface of the coating. As shown by curve 118, shifting view angle causes relatively little variation in the color of coating 36, allowing the coating to maintain a stable red-orange appearance regardless of how the viewer is viewing the coating.

As an example, at a viewing angle of zero degrees, coating 36 in the fifth implementation may exhibit an L* value between 50-52, 45-55, 45-52, 48-58, less than 52, less than 55, greater than 50, greater than 45, or other L* values in a L*a*b* color space. At the viewing angle of zero degrees, coating 36 in the fifth implementation may exhibit an a* value between 39-41, 35-45, 30-50, less than 41, less than 45, greater than 40, greater than 35, or other a* values in the L*a*b* color space. At the viewing angle of zero degrees, coating 36 in the fifth implementation may exhibit a b* value between 44-47, 40-50, 42-50, less than 46, less than 50, greater than 40, greater than 45, or other b* values in the L*a*b* color space.

In a sixth implementation, transition layer 50 of FIG. 4 includes CrN and the layers of thin-film interference filter 38 and the composition and thicknesses of the layers of thin-film interference filter 38 may be selected so that coating 36 exhibits a substantially orange color across a predetermined range of angles of incidence. In this example, the thickness 82 of SiCrN layer 70 may be selected to be 30-50 nm, 25-45 nm, 36-54 nm, 30-41 nm, greater than 30 nm, greater than 25 nm, less than 45 nm, less than 50 nm, 36 nm, 41 nm, 39 nm, or other thicknesses. The thickness 84 of SiH layer 72 may be selected to be 45-55 nm, 45-60 nm, 40-60 nm, 41-55 nm, 42-58 nm, 55 nm, 48 nm, 43 nm, or other thicknesses. The thickness 86 of SiN layer 74 may be selected to be 10-20 nm, 10-25 nm, 15-25 nm, 10-30 nm, 5-30 nm, greater than 10 nm, less than 20 nm, less than 25 nm, 15 nm, 22 nm, 17 nm, or other thicknesses. The thickness 88 of SiH layer 76 may be selected to be 55-65 nm, 50-70 nm, 55-70 nm, 48-66 nm, 50 nm, 56 nm, 57 nm, or other thicknesses. The thickness 90 of SiN layer 78 may be selected to be 20-30 nm, 15-30 nm, 10-25 nm, 17-23 nm, 21 nm, 22 nm, 16 nm, 20 nm, or other thicknesses. Finally, the thickness 80 of TiN layer 80 may be selected to be 35-45 nm, 30-50 nm, 40-45 nm, 33-42 nm, 37 nm, 45 nm, 39 nm, or other thicknesses.

Curve 110 of FIG. 7 plots the color response of coating 36 in the sixth implementation. As shown by curve 112, configuring coating 36 according to the fifth implementation way may provide the coating with a broad peak at relatively long wavelengths in the visible spectrum, which configures the coating to exhibit a relatively bright orange color when viewed by an observer.

In addition, configuring coating 36 according to the sixth implementation may provide the coating with a relatively stable color response for different viewing angles. Curve 120 of FIG. 8 illustrates how the color of coating 36 (in an a*b* color space) varies at different viewing angles (angles of incidence) from zero degrees to 60 degrees relative to an axis normal to the lateral surface of the coating. As shown by curve 120, shifting view angle causes relatively little variation in the color of coating 36, allowing the coating to maintain a stable orange appearance regardless of how the viewer is viewing the coating.

As an example, at a viewing angle of zero degrees, coating 36 in the sixth implementation may exhibit an L* value between 61-64, 60-65, 55-70, less than 64, less than 65, greater than 60, greater than 55, or other L* values in a L*a*b* color space. At the viewing angle of zero degrees, coating 36 in the sixth implementation may exhibit an a* value between 30-33, 30-35, 28-38, less than 32, less than 35, greater than 30, greater than 25, or other a* values in the L*a*b* color space. At the viewing angle of zero degrees, coating 36 in the sixth implementation may exhibit a b* value between 64-66, 60-70, 62-71, less than 66, less than 70, greater than 65, greater than 60, or other b* values in the L*a*b* color space.

In a seventh implementation, transition layer 50 of FIG. 4 includes CrN and the layers of thin-film interference filter 38 and the composition and thicknesses of the layers of thin-film interference filter 38 may be selected so that coating 36 exhibits a substantially light orange color across a predetermined range of angles of incidence. In this example, the thickness 82 of SiCrN layer 70 may be selected to be 30-50 nm, 25-45 nm, 26-54 nm, 30-41 nm, greater than 30 nm, greater than 25 nm, less than 45 nm, less than 50 nm, 34 nm, 36 nm, 29 nm, or other thicknesses. The thickness 84 of SiH layer 72 may be selected to be 45-55 nm, 40-60 nm, 30-60 nm, 41-55 nm, 42-58 nm, 45 nm, 48 nm, 53 nm, or other thicknesses. The thickness 86 of SiN layer 74 may be selected to be 10-20 nm, 10-25 nm, 5-25 nm, 10-30 nm, 5-30 nm, greater than 10 nm, less than 20 nm, less than 25 nm, 14 nm, 12 nm, 17 nm, or other thicknesses. The thickness 88 of SiH layer 76 may be selected to be 50-65 nm, 50-70 nm, 45-70 nm, 48-66 nm, 53 nm, 56 nm, 47 nm, or other thicknesses. The thickness 90 of SiN layer 78 may be selected to be 15-30 nm, 10-30 nm, 10-25 nm, 17-23 nm, 19 nm, 22 nm, 16 nm, 15 nm, or other thicknesses. Finally, the thickness 80 of TiN layer 80 may be selected to be 35-45 nm, 30-50 nm, 20-45 nm, 33-42 nm, 37 nm, 41 nm, 35 nm, or other thicknesses.

Curve 108 of FIG. 7 plots the color response of coating 36 in the sixth implementation. As shown by curve 108, configuring coating 36 according to the fifth implementation way may provide the coating with a broad peak at relatively long wavelengths in the visible spectrum, which configures the coating to exhibit a relatively bright light orange color when viewed by an observer.

In addition, configuring coating 36 according to the seventh implementation may provide the coating with a relatively stable color response for different viewing angles. Curve 122 of FIG. 8 illustrates how the color of coating 36 (in an a*b* color space) varies at different viewing angles (angles of incidence) from zero degrees to 60 degrees relative to an axis normal to the lateral surface of the coating. As shown by curve 122, shifting view angle causes relatively little variation in the color of coating 36, allowing the coating to maintain a stable light orange appearance regardless of how the viewer is viewing the coating.

As an example, at a viewing angle of zero degrees, coating 36 in the seventh implementation may exhibit an L* value between 69-72, 70-65, 65-73, less than 71, less than 75, greater than 70, greater than 65, or other L* values in a L*a*b* color space. At the viewing angle of zero degrees, coating 36 in the seventh implementation may exhibit an a* value between 20-22, 18-25, 15-30, less than 21, less than 25, greater than 20, greater than 15, or other a* values in the L*a*b* color space. At the viewing angle of zero degrees, coating 36 in the seventh implementation may exhibit a b* value between 78-80, 75-81, 70-85, less than 79, less than 80, greater than 75, greater than 70, or other b* values in the L*a*b* color space.

In an eighth implementation, transition layer 50 of FIG. 4 includes CrSiN and the layers of thin-film interference filter 38 and the composition and thicknesses of the layers of thin-film interference filter 38 may be selected so that coating 36 exhibits a substantially yellow color across a predetermined range of angles of incidence. In this example, the thickness 82 of SiCrN layer 70 may be selected to be 20-30 nm, 15-35 nm, 16-34 nm, greater than 20 nm, greater than 15 nm, less than 30 nm, less than 35 nm, 25 nm, 26 nm, 29 nm, or other thicknesses. The thickness 84 of SiH layer 72 may be selected to be 30-40 nm, 25-45 nm, 30-36 nm, 26-35 nm, 34 nm, 36 nm, 39 nm, or other thicknesses. The thickness 86 of SiN layer 74 may be selected to be 50-60 nm, 45-65 nm, 52-56 nm, 40-60 nm, greater than 50 nm, less than 55 nm, less than 60 nm, 54 nm, 52 nm, 57 nm, or other thicknesses. The thickness 88 of SiH layer 76 may be selected to be 35-50 nm, 40-50 nm, 35-43 nm, 38-56 nm, 42 nm, 46 nm, 37 nm, or other thicknesses. The thickness 90 of SiN layer 78 may be selected to be 30-50 nm, 35-40 nm, 30-45 nm, 37-43 nm, 38 nm, 42 nm, 36 nm, 45 nm, or other thicknesses. Finally, the thickness 80 of TiN layer 80 may be selected to be 35-50 nm, 30-50 nm, 40-45 nm, 33-42 nm, 42 nm, 43 nm, 45 nm, or other thicknesses.

Figure 9:
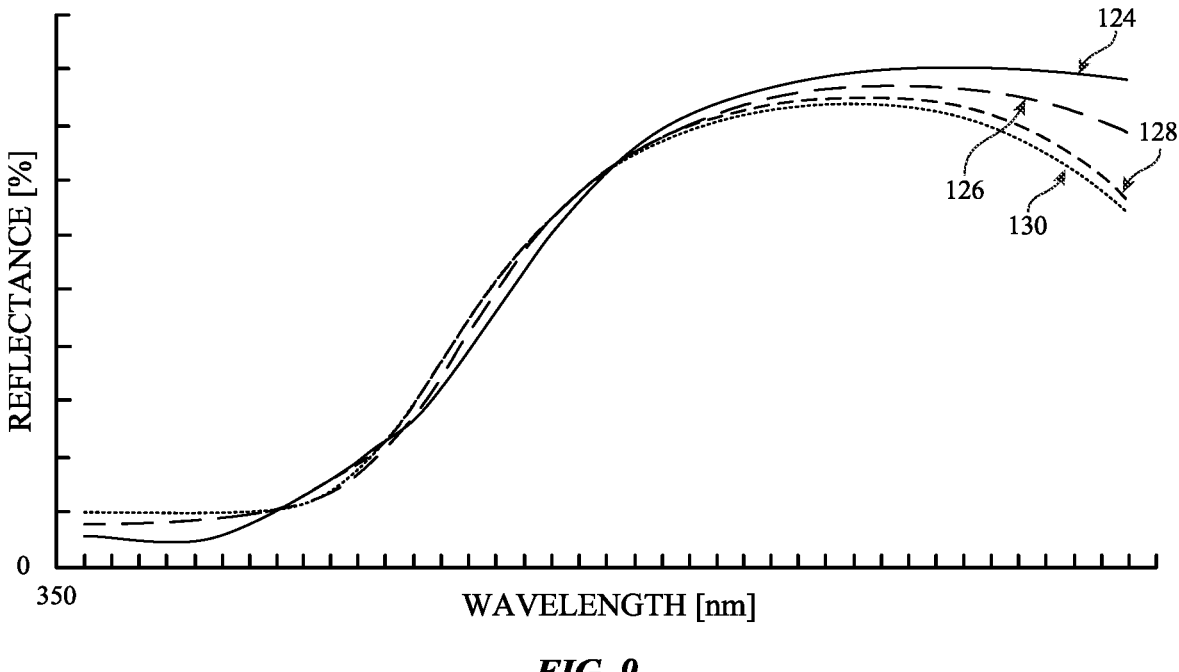
FIG. 9 is a plot of reflectance as a function of wavelength for four further illustrative coatings of the type shown in FIG. 4 that exhibit a yellow hue in accordance with some embodiments.

Curve 126 of FIG. 9 plots the color response of coating 36 in the eighth implementation. As shown by curve 126, configuring coating 36 according to the eighth implementation way may provide the coating with a broad peak at relatively mid-long wavelengths in the visible spectrum, which configures the coating to exhibit a relatively bright yellow color when viewed by an observer.

Figure 10:
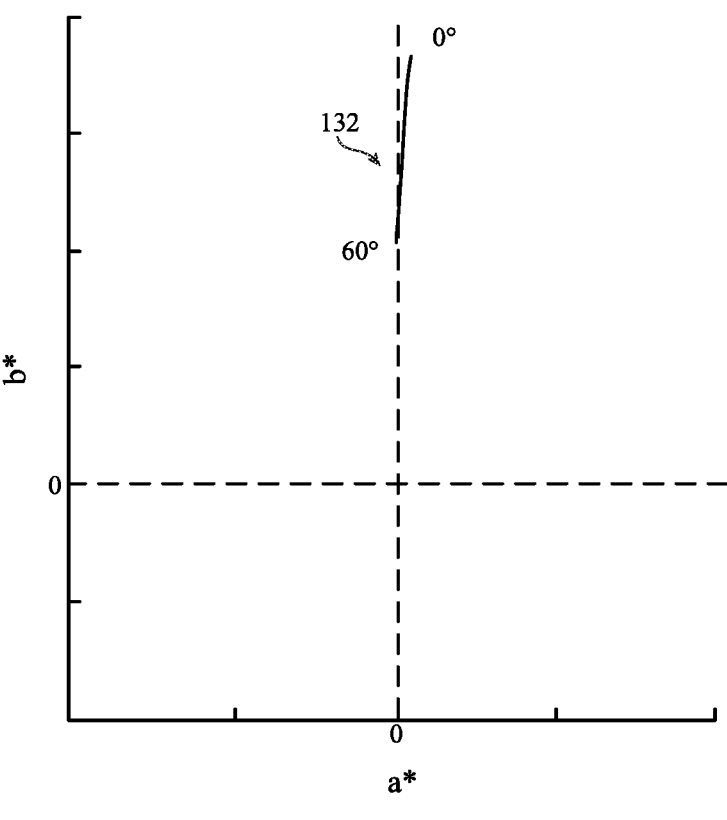
FIG. 10 is a plot of a*b* color space showing how the coating illustrated in FIG. 9 may exhibit a yellow hue across different angles of incidence in accordance with some embodiments.

In addition, configuring coating 36 according to the eighth implementation may provide the coating with a relatively stable color response for different viewing angles. Curve 132 of FIG. 10 illustrates how the color of coating 36 (in an a*b* color space) varies at different viewing angles (angles of incidence) from zero degrees to 60 degrees relative to an axis normal to the lateral surface of the coating. As shown by curve 132, shifting view angle causes relatively little variation in the color of coating 36, allowing the coating to maintain a stable yellow appearance regardless of how the viewer is viewing the coating.

As an example, at a viewing angle of zero degrees, coating 36 in the eighth implementation may exhibit an L* value between 86-89, 80-90, 75-95, less than 88, less than 90, greater than 85, greater than 80, or other L* values in a L*a*b* color space. At the viewing angle of zero degrees, coating 36 in the eighth implementation may exhibit an a* value between 0-2, 0-5, 0-15, less than 2, less than 10, greater than 0, greater than 1, or other a* values in the L*a*b* color space. At the viewing angle of zero degrees, coating 36 in the eighth implementation may exhibit a b* value between 67-70, 65-72, 60-75, less than 70, less than 75, greater than 65, greater than 60, greater than 50, or other b* values in the L*a*b* color space.

In a ninth implementation, transition layer 50 of FIG. 4 includes CrSiN and the layers of thin-film interference filter 38 and the composition and thicknesses of the layers of thin-film interference filter 38 may be selected so that coating 36 exhibits a substantially yellow color across a predetermined range of angles of incidence. In this example, the thickness 82 of SiCrN layer 70 may be selected to be 20-30 nm, 15-35 nm, 16-34 nm, greater than 20 nm, greater than 15 nm, less than 30 nm, less than 35 nm, 25 nm, 27 nm, 31 nm, or other thicknesses. The thickness 84 of SiH layer 72 may be selected to be 20-40 nm, 25-45 nm, 20-36 nm, 26-35 nm, 34 nm, 28 nm, 29 nm, or other thicknesses. The thickness 86 of SiN layer 74 may be selected to be 60-80 nm, 70-75 nm, 62-76 nm, 40-80 nm, greater than 70 nm, less than 75 nm, less than 80 nm, 64 nm, 72 nm, 77 nm, or other thicknesses. The thickness 88 of SiH layer 76 may be selected to be 35-50 nm, 40-50 nm, 35-43 nm, 38-56 nm, 42 nm, 47 nm, 38 nm, or other thicknesses. The thickness 90 of SiN layer 78 may be selected to be 40-60 nm, 50-55 nm, 45-60 nm, 37-53 nm, 48 nm, 51 nm, 56 nm, 45 nm, or other thicknesses. Finally, the thickness 80 of TiN layer 80 may be selected to be 65-70 nm, 60-80 nm, 50-75 nm, 63-72 nm, 62 nm, 73 nm, 68 nm, or other thicknesses.

Curve 124 of FIG. 9 plots the color response of coating 36 in the ninth implementation. As shown by curve 124, configuring coating 36 according to the ninth implementation way may provide the coating with a broad peak at relatively mid-long wavelengths in the visible spectrum, which configures the coating to exhibit a relatively bright yellow color when viewed by an observer.

In a tenth implementation, transition layer 50 of FIG. 4 includes CrSiN and the layers of thin-film interference filter 38 and the composition and thicknesses of the layers of thin-film interference filter 38 may be selected so that coating 36 exhibits a substantially yellow color across a predetermined range of angles of incidence. In this example, the thickness 82 of SiCrN layer 70 may be selected to be 20-30 nm, 15-35 nm, 16-34 nm, greater than 20 nm, greater than 15 nm, less than 30 nm, less than 35 nm, 25 nm, 27 nm, 31 nm, or other thicknesses. The thickness 84 of SiH layer 72 may be selected to be 20-40 nm, 25-45 nm, 20-36 nm, 26-35 nm, 34 nm, 28 nm, 35 nm, or other thicknesses. The thickness 86 of SiN layer 74 may be selected to be 40-60 nm, 45-50 nm, 42-56 nm, 40-80 nm, greater than 40 nm, less than 50 nm, 48 nm, 52 nm, 47 nm, or other thicknesses. The thickness 88 of SiH layer 76 may be selected to be 35-50 nm, 30-50 nm, 35-43 nm, 38-56 nm, 42 nm, 37 nm, 39 nm, or other thicknesses. The thickness 90 of SiN layer 78 may be selected to be 30-60 nm, 30-45 nm, 35-50 nm, 37-53 nm, 37 nm, 41 nm, 36 nm, 35 nm, or other thicknesses. Finally, the thickness 80 of TiN layer 80 may be selected to be 30-35 nm, 25-35 nm, 20-45 nm, 32 nm, 43 nm, 38 nm, or other thicknesses.

Curve 130 of FIG. 9 plots the color response of coating 36 in the ninth implementation. As shown by curve 130, configuring coating 36 according to the tenth implementation way may provide the coating with a broad peak at relatively mid-long wavelengths in the visible spectrum, which configures the coating to exhibit a relatively bright yellow color when viewed by an observer.

In an eleventh implementation, coating 36 is provided with the same layer compositions and thicknesses as the tenth implementation, but transition layer 50 of FIG. 4 is a CrN layer instead of a CrSiN layer. Curve 128 of FIG. 9 plots the color response of coating 36 in the eleventh implementation. As shown by curve 128, configuring coating 36 according to the second implementation way may provide the coating with a broad peak at relatively mid-long wavelengths in the visible spectrum, which configures the coating to exhibit a relatively bright yellow color when viewed by an observer.

Figure 11:
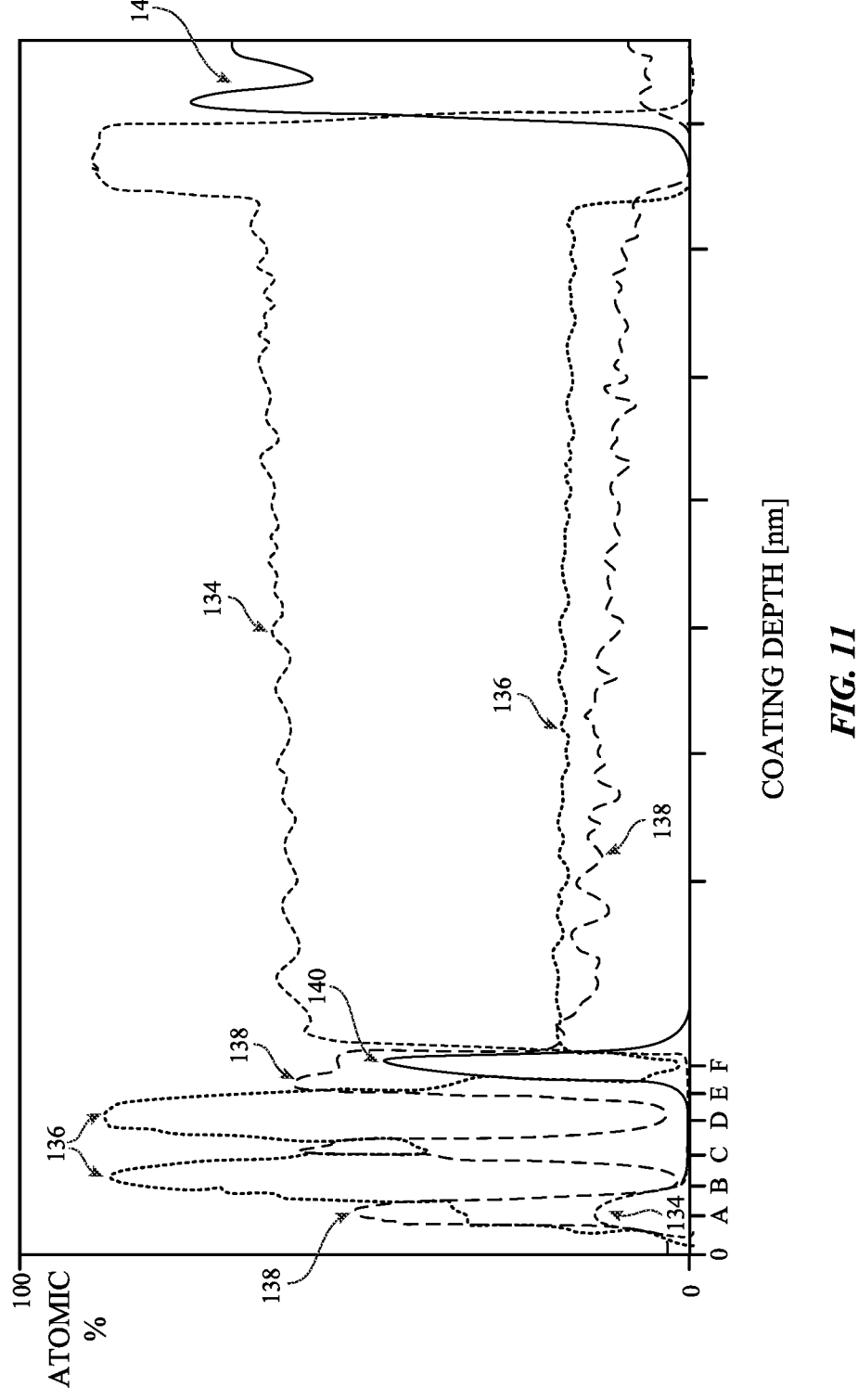
FIG. 11 is a plot that shows an exemplary composition (atomic percentage) at different depths through an illustrative coating of the type shown in FIG. 4 in accordance with some embodiments.

FIG. 11 is a plot of the composition of coating 36 in the first implementation (e.g., the implementation associated with curve 104 of FIG. 5 and curve 106 of FIG. 6). The curves of FIG. 11 are generated using an energy dispersive spectroscopy (EDS) line scan that measures the atomic percentage of different elements at different depths from the exterior surface and through the thickness of coating 36.

As shown in FIG. 11, curve 134 plots the atomic percentage (%) of chromium (Cr) atoms through the thickness of coating 36. Curve 136 plots the atomic percentage of silicon (Si) atoms through the thickness of coating 36. Curve 138 plots the atomic percentage of nitrogen (N) atoms through the thickness of coating 36. Curve 140 plots the atomic percentage of titanium (Ti) atoms through the thickness of coating 36.

As shown by curve 134, coating 38 exhibits a relatively high percentage (e.g., a peak) of Cr atoms within SiCrN layer 70 of FIG. 4 (e.g., within the uppermost layer of the coating, located at depth A) and within adhesion and transition layers 40 of FIG. 4 (e.g., at depths greater than depth F). As shown by curve 136, coating 38 exhibits a relatively high percentage (e.g., peaks) of Si atoms within SiCrN layer 70 of FIG. 4, SiH layer 72 of FIG. 4 (e.g., within the second-uppermost layer of the coating, located at depth B), SiN layer 74 of FIG. 4 (e.g., within the third-uppermost layer of the coating, located at depth C), SiH layer 76 of FIG. 4 (e.g., within the third-lowermost layer of the coating, located at depth D), SiN layer 78 of FIG. 4 (e.g., within the second-lowermost layer of the coating, located at depth E), and transition layer 50 of FIG. 4 (e.g., at depths greater than depth F when transition layer 50 includes CrSiN as in the first implementation). As shown by curve 138, coating 38 exhibits a relatively high percentage (e.g., peaks) in N atoms within SiCrN layer 70 of FIG. 4, within SiN layer 74 of FIG. 4, within SiN layer 78 of FIG. 4, within TiN layer 80 of FIG. 4 (e.g., within the lowermost layer of the coating, located at depth F), and within transition layer 50 of FIG. 4. Finally, as shown by curve 140, coating 38 exhibits a relatively high percentage (e.g., a peak) in Ti atoms within TiN layer 80 of FIG. 4.

As examples, in the first implementation, the composition of SiCrN layer 70 of FIG. 4 may be selected such that the atomic percentage of Cr atoms in SiCrN layer 70 is 10-15%, 10-20%, 5-30%, 6-31%, 13-15%, 5-25%, greater than 10%, less than 20%, or other values. The composition of SiCrN layer 70 of FIG. 4 may be selected such that the atomic percentage of Si atoms in SiCrN layer 70 is 30-40%, 25-45%, 20-50%, 32-39%, 28-42%, greater than 30%, greater than 25%, less than 40%, less than 45%, or other values. The remainder of the atomic percentage of SiCrN layer 70 may be N atoms.

In the first implementation, the composition of SiH layer 72 of FIG. 4 may be selected such that the atomic percentage of Si atoms in SiH layer 72 is 95-98%, 97-98%, 90-98%, 85-99%, greater than 97%, greater than 95%, greater than 90%, less than 99%, or other values. The remainder of the atomic percentage of SiH layer 72 may be H atoms.

In the first implementation, the composition of SiN layer 74 of FIG. 4 may be selected such that the atomic percentage of Si atoms in SiN layer 74 is 30-50%, 35-48%, 38-48%, 25-49%, greater than 35%, greater than 30%, less than 50%, or other values. The remainder of the atomic percentage of SiN layer 74 may be N atoms.

In the first implementation, the composition of SiH layer 76 of FIG. 4 may be selected such that the atomic percentage of Si atoms in SiH layer 76 is 95-98%, 97-98%, 90-98%, 85-99%, greater than 97%, greater than 95%, less than 99%, greater than 90%, or other values. The remainder of the atomic percentage of SiH layer 72 may be H atoms.

In the first implementation, the composition of SiN layer 78 of FIG. 4 may be selected such that the atomic percentage of Si atoms in SiN layer 78 is 30-50%, 35-48%, 38-48%, 25-49%, greater than 35%, greater than 30%, less than 50%, or other values. The remainder of the atomic percentage of SiN layer 74 may be N atoms.

In the first implementation, the composition of TiN layer 80 of FIG. 4 may be selected such that the atomic percentage of Ti atoms in TiN layer 80 is 40-60%, 45-55%, 38-58%, greater than 40%, greater than 35%, less than 60%, or other values. The remainder of the atomic percentage of TiN layer 80 may be N atoms.

In the first implementation, the composition of transition layer 50 of FIG. 4 may be selected such that the atomic percentage of Cr atoms in transition layer 50 is 50-80%, 60-75%, 62-70%, 55-79%, greater than 60%, greater than 55%, less than 75%, or other values. The atomic percentage of Si atoms in transition layer 50 may be 10-30%, 15-25%, 19-23%, 5-29%, greater than 15%, greater than 10%, less than 30%, less than 40%, or other values. The remainder of the atomic percentage of transition layer 50 may be Si atoms. These atomic percentages may be atomic percentages after normalizing, for example.

The examples of FIGS. 4-11 are merely illustrative. Additional elements may be included in one or more of the layers of coating 36. The layers may be arranged in other orders. The layers may have different thicknesses or compositions. The coating may have other color profiles and angular responses. The SiCrN layers described herein may sometimes also be referred to as CrSiN layers and vice versa (e.g., these layers may be layers that include Si, Cr, and N atoms).

The foregoing is merely illustrative and various modifications can be made to the described embodiments. The foregoing embodiments may be implemented individually or in any combination.

What is claimed is:

1. Apparatus comprising:
a conductive substrate; and
a coating on the conductive substrate and having a color, the coating comprising:
adhesion and transition layers, and
a thin-film interference filter on the adhesion and transition layers, wherein the thin-film interference filter comprises a SiCrN layer that forms an uppermost layer of the thin-film interference filter, a TiN layer that forms a lowermost layer of the thin-film interference filter, a set of SiH layers, and a set of SiN layers interleaved with the set of SiH layers.

2. The apparatus of claim 1, wherein the SiCrN layer has a thickness between 20 nm and 50 nm.

3. The apparatus of claim 2, wherein the TiN layer has a thickness between 30 nm and 80 nm.

4. The apparatus of claim 3, wherein the set of SiN layers comprises a first SiN layer on the TiN layer and a second SiN layer and wherein the set of SiH layers comprises a first SiH layer interposed between the first SiN layer and the second SiN layer and comprises a second SiH layer, the second SiH layer being interposed between the second SiN layer and the SiCrN layer.

5. The apparatus of claim 4, wherein the first SiH layer has a thickness between 30 nm and 80 nm and the second SiH layer has a thickness between 30 nm and 70 nm.

6. The apparatus of claim 5, wherein the first SiN layer has a thickness between 10 nm and 40 nm.

7. The apparatus of claim 6, wherein the second SiN layer has a thickness between 10 nm and 120 nm.

8. The apparatus of claim 7, wherein the thickness of the SiCrN layer is between 30 nm and 45 nm, the thickness of the second SiH layer is between 40 nm and 60 nm, the thickness of the second SiN layer is between 10 nm and 25 nm, the thickness of the first SiH layer is between 50 nm and 65 nm, the thickness of the first SiN layer is between 10 nm and 30 nm, and the thickness of the TiN layer is between 30 nm and 50 nm.

9. The apparatus of claim 8, wherein the coating has an L* value at an angle of incidence of zero degrees that is greater than 50 in an L*a*b* color space, an a* value at the angle of incidence that is greater than 20 in the L*a*b* color space, and a b* value that is greater than 40 in the L*a*b* color space.

10. The apparatus of claim 8, wherein the adhesion and transition layers comprise a CrSiN transition layer, the thin-film interference filter being disposed on the CrSiN transition layer.

11. The apparatus of claim 10, wherein an atomic percentage of Cr atoms in the SiCrN layer is between 5% and 30%, an atomic percentage of Si atoms in the SiCrN layer is between 20% and 50%, an atomic percentage of Si atoms in the first and second SiH layers is greater than 90%, an atomic percentage of Si atoms in the first and second SiN layers is between 30% and 50%, and an atomic percentage of Ti atoms in the TiN layer is between 40% and 60%.

12. The apparatus of claim 8, wherein the adhesion and transition layers comprise a CrN transition layer, the thin-film interference filter being disposed on the CrN transition layer.

13. The apparatus of claim 8, wherein the adhesion and transition layers comprise a CrSiN transition layer, the thin-film interference filter is disposed on the CrSiN transition layer, the thickness of the SiCrN layer is between 20 nm and 30 nm, the thickness of the second SiH layer is between 30 nm and 40 nm, the thickness of the second SiN layer is between 50 nm and 60 nm, the thickness of the first SiH layer is between 35 nm and 50 nm, the thickness of the first SiN layer is between 30 nm and 45 nm, and the thickness of the TiN layer is between 30 nm and 50 nm.

14. The apparatus of claim 13, wherein the coating has an L* value at an angle of incidence of zero degrees that is greater than 80 in an L*a*b* color space, an a* value at the angle of incidence that is greater than 0 in the L*a*b* color space, and a b* value that is greater than 50 in the L*a*b* color space.

15. Apparatus comprising:
a conductive substrate; and
a coating on the conductive substrate and having a color, the coating comprising:
adhesion and transition layers,
a TiN layer on the adhesion and transition layers,
first and second SiH layers,
first and second SiN layers, wherein the first SiH layer is interposed between the first and second SiN layers and wherein the first SiN layer is interposed between the first SiH layer and the TiN layer, and
a SiCrN layer, wherein the second SiH layer is interposed between the SiCrN layer and the second SiN layer.

16. The apparatus of claim 15, wherein the adhesion and transition layers comprise a CrSiN transition layer.

17. The apparatus of claim 15, wherein the adhesion and transition layers comprise a CrN transition layer.

18. The apparatus of claim 15, wherein the conductive substrate comprises stainless steel.

19. An electronic device comprising:
a conductive structure; and
a coating on the conductive structure and having a color, the coating comprising:
adhesion and transition layers,
a first layer on the adhesion and transition layer that comprises titanium and nitrogen,
a second layer that comprises silicon and nitrogen,
a third layer that comprises silicon and hydrogen,
a fourth layer that comprises silicon and nitrogen,
a fifth layer that comprises silicon and hydrogen, and
a sixth layer that comprises silicon, chromium, and nitrogen.

20. The electronic device of claim 19, wherein the second, third, fourth, and fifth layers form at least part of a thin-film interference filter and the sixth layer is an uppermost layer of the thin-film interference filter.

* * * * *